United States Patent [19]

Taylor et al.

[11] 4,028,673
[45] June 7, 1977

[54] CROSSWIND MEASUREMENTS THROUGH PATTERN RECOGNITION TECHNIQUES

[75] Inventors: Fredrick J. Taylor, Cincinnati, Ohio; Jack Smith; Thomas H. Pries, both of El Paso, Tex.

[73] Assignee: The United States of America as represented by the Secretary of the Army, Washington, D.C.

[22] Filed: Oct. 31, 1975

[21] Appl. No.: 627,631

[52] U.S. Cl. .................. 340/146.3 R; 340/146.3 F; 340/146.3 Q; 356/28; 356/106 R; 356/107; 356/201

[51] Int. Cl.² .......................................... G06K 9/00

[58] Field of Search ............... 356/201, 207, 106 R, 356/107; 350/162 R; 250/550, 564, 565, 573, 574; 73/188, 189; 340/146.3 P

[56] References Cited

UNITED STATES PATENTS

| | | | |
|---|---|---|---|
| 3,567,324 | 3/1971 | Brooks | 356/107 |
| 3,746,452 | 7/1973 | Teboul et al. | 356/201 |
| 3,883,850 | 5/1975 | Martin et al. | 179/1 SA |
| 3,915,572 | 10/1975 | Orloff | 356/106 R |

OTHER PUBLICATIONS

Lawrence et al., "Use of Scintillations to Measure Average Wind Across a Light Beam," *Applied Optics*, vol. 11, No. 2, Feb. 1972, pp. 239-243.

*Primary Examiner*—Leo H. Boudreau
*Attorney, Agent, or Firm*—Nathan Edelberg; Daniel D. Sharp; Jeremiah G. Murray

[57] ABSTRACT

An optical device for measuring crosswinds by pattern recognition techniques is described. The device includes a minicomputer to process observed spectral profiles. In the training phase spectral features, which are weakly intercorrelated but strongly correlated with the crosswind, are selected and classified with known winds. This data is stored in the computer. During the execution phase, the observed spectral features are compared with the previously stored classifications to yield a best estimate of the crosswind.

5 Claims, 5 Drawing Figures

CROSSWIND MEASUREMENTS THROUGH PATTERN RECOGNITION TECHNIQUES

RIGHTS OF GOVERNMENT

The invention described herein may be manufactured and used by or for the Government for governmental purposes without the payment of any royalties thereon or therefor.

BACKGROUND OF INVENTION

1. Field of Invention

The present invention relates to a method and apparatus for optically measuring crosswinds. More specifically, the present invention relates to a method and apparatus for optically measuring crosswinds by a pattern recognition technique.

2. Description of Prior Art

Techniques have been developed for measuring average crosspath winds by observing the characteristics of an optical beam in a receiving plane. The basic measurement involves a laser source, and correlation measurements within the diffraction pattern produced at the receiver, by the atmospheric turbulence interacting with the transmitted beam. The turbulence is considered to be frozen and the bulk air motion carries the turbulence through the beam. This produces a diffraction pattern velocity which is related to the crosswind speed.

Lawrence, Ochs and Clifford have developed a system for obtaining wind speed from a measurement of the time change in the correlation function observed by two closely spaced detectors. This system is described in a publication entitled "Use of Scintillations to Measure Average Wind Across a Light Beam", Applied Optics, 11, February 1972, p. 239. The system produces good results when operating in weak turbulence or over short paths in strong turbulence. However, the system performs poorly with strong turbulence over long paths. The effects of strong turbulence on the observed correlation characteristics are not well understood, so system parameters cannot be selected to obtain an accurate wind measurement. This is most probably due to the fact that the temporal spectral density of the amplitude fluctuations of a laser beam through strong turbulence does not follow the inverse root path length, $L^{-1/2}$, prediction.

Optical devices currently used for crosswind measurements are calibrated and results interpreted on the basis of theoretical predictions. However, under strong turbulence conditions, the experimental observations do not compare well with the theoretical predictions. Thus, the optical device performance deteriorates with increased turbulent intensity.

SUMMARY OF THE INVENTION

Accordingly, it is an object of the present invention to provide an optical system for measuring crosswinds from observed experimental data rather than from a mathematical model.

It is a further object of the present invention to provide an optical system for measuring crosswinds which operates in the frequency rather than the time domain.

It is still a further object of the present invention to provide an optical system for measuring crosswinds which is self-calibrating.

It is another object of the present invention to provide an optical system for measuring crosswinds which operates independently of optical saturation and abnormal meteorological conditions.

It is yet another object of the present invention to provide an optical system for measuring other atmospheric parameters in addition to crosswinds.

It is still another object of the present invention to provide a control means for systems subject to crosswind disturbances.

The objects of the present invention are fulfilled by providing a pattern recognition system for measuring crosswinds.

Pattern recognition methods, when properly configured, are ideally suited to classifying cause-effect relationships. The feature set can consist of as many elements as the designer feels the system can support from an execution time core available standpoint. The features are generated from a pattern vector which in turn is generated from direct system measurements. The ability to use actual system data bypasses the modeling problems inherent in model reference methods. In addition, no system calibration is required and thereby no operator skill is needed, which is not always the case for model reference methods. Since the device is continually learning cause-effect relationships, changes in terrain, path length, meteorological conditions, and saturation indices are easily handled by the system if they are duly noted during training. Complex, nonlinear time varying effects, which are not understood theoretically to date, are no longer an impasse since they are not modeled in a learning machine approach. Changes in the system's configuration, such as detectors, electronic signal processor and wavelength, unlike model reference methods, can be easily handled by simply learning the cause-effect relations under that given system configuration. Since the availability of mini and/or microprocessors, with the speeds and core size required for pattern recognition operation, at an ever decreasing cost, the method of the present invention for processing wind data is attractive from an economic, implementation, and performance viewpoint.

Accordingly, the pattern recognition system of the present invention utilizes a minicomputer to process observed spectral profiles. Spectral features, which are weakly intercorrelated but strongly correlated with crosswind, are selected and classified with known winds. This data is stored in the minicomputer. The computer then compares the observed spectral features with the previously stored classifications to yield a best estimate of the crosswind.

BRIEF DESCRIPTION OF DRAWINGS

The objects of the present invention and the attendant advantages thereof will become more readily apparent by reference to the following description of the drawings, wherein like numerals refer to like parts and the respective figures illustrate the following.

DETAILED DESCRIPTION OF DRAWINGS

Background Theory

Some insight into the difficulties encountered under strong turbulence conditions can be obtained by considering the power spectral density of the log-amplitude fluctuations of an optical beam propagating through a turbulent atmosphere. Clifford has shown in the publication entitled "Temporal-frequency Spectra for a Spherical Wave Propagating through Atmospheric Turbulence," JOSA, 61, No. 10, October 1971, p. 1285, that the weak turbulence the spectral density spherical wave can be expressed in equation (1) as follows:

$$W(f) = .428 \, \pi^2 k^2 \int_o^L dz \int_{\frac{2\pi f}{\nu}}^{\infty} dK \, K^{-8/3} C_n^2(z)$$

$$[(K\nu)^2 - (2\pi f)^2]^{-1/2} \sin^2\left[\frac{K^2 z(L-z)}{2kL}\right]$$

where $k$ is the source wave number $2\pi/\lambda$; $K$ is spatial frequency of the turbulence; $z$ is the path position; $f$ is the temporal frequency; $C_n(z)$ is the turbulence strength; $L$ is the path length, and $\nu$ is the crosswind speed. In the above expression a Kolmogorov refractivity spectrum has been assumed.

Figure 1:
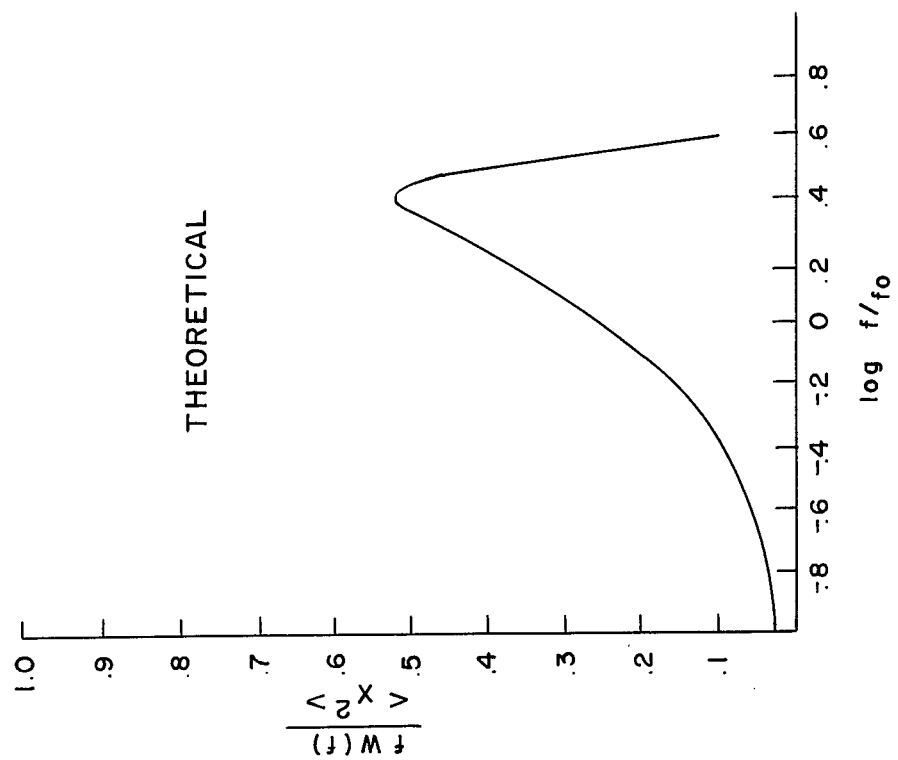
FIG. 1 is a graphic illustration of a theoretical representation of the power spectral density of the log-amplitude fluctuations of an optical beam propagating through a turbulent atmosphere.

FIG. 1 illustrates the characteristics $fW(f)$ as a function of the normalization frequency, $f_o = \nu \, (2\pi L)^{-1/2}$. The shape of the curve is universal and changes in $\lambda$, $L$, or $\nu$ merely modify the scales. Theoretically, then the shape is constant and the peak occurs at a frequency which is directly related to $f_o$.

Figure 2:
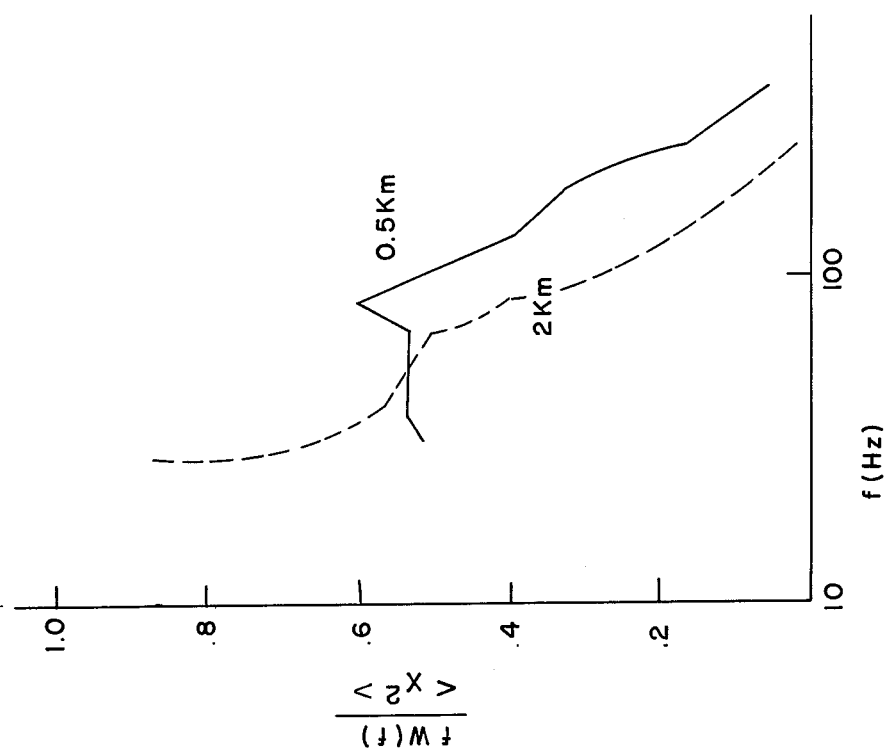
FIG. 2 is a graphic illustration of experimental frequency spectra of an optical beam obtained over 0.5 Km and 2.0 Km paths for weak turbulent conditions.
Figure 3:
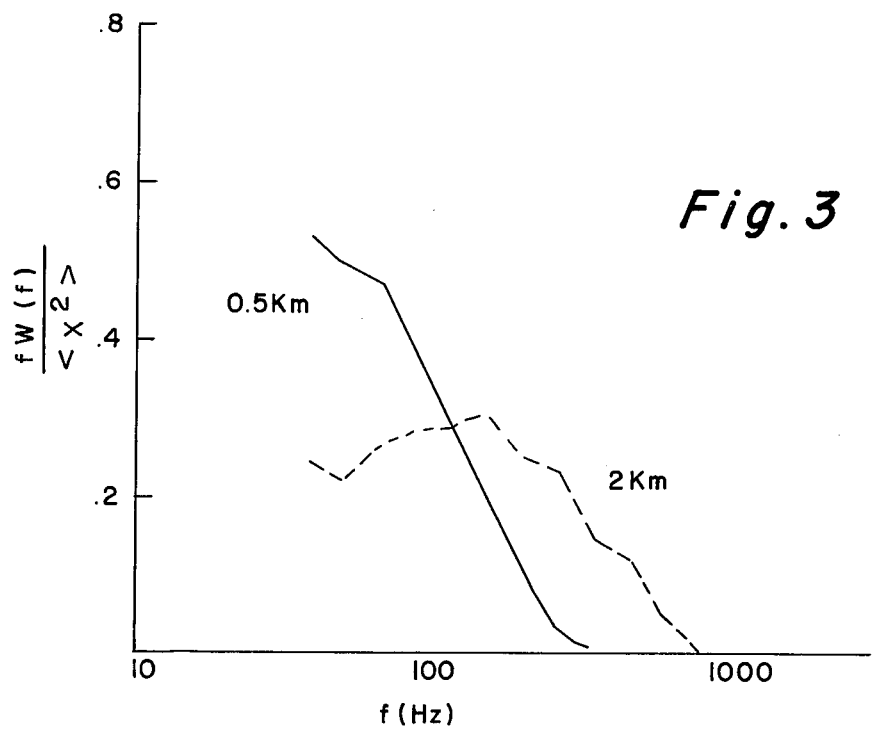
FIG. 3 is a graphic illustration of experimental frequency spectra of an optical beam obtained over 0.5 Km and 2.0 Km paths for strong turbulent conditions.

In contrast to the above situation FIGS. 2 and 3 illustrate experimental spectra obtained under conditions of weak and strong turbulence respectively. FIG. 2 compares the spectra obtained from amplitude fluctuations obtained from 0.5 and 2-km paths. The shapes and scaling are in general agreement with the predictions of Eq. (1) above.

FIG. 3 illustrates the spectra obtained under strong turbulence conditions. While the 0.5-km results are in general agreement with the predictions of Eq. (1), the 2-km results do not obey the scaling predicted. Under these latter conditions the optical crosswind measurements did not yield accurate results.

In each of FIGS. 1 to 3 $<X^2>$ represents the variance of the temporal log amplitude fluctuations of the optical signal.

The nature of the change in the spectral characteristics under strong, turbulence is not well developed. The system parameters of Eq. (1) are probably dependent on the strength of turbulence and should be varied as conditions change. Since wind measurement systems based on a theoretical model are beyond the current state-of-the-art, alternative methods had to be sought. The most promising automated approach to the problem of remote sensing winds using optically sensed information appears to be through pattern recognition of the present invention. It shall be shown that this technique bypasses all the theoretically insolvable problems associated with existing wind measurement systems. In addition, the performance of such a system is investigated experimentally as a general method.

Mathematically, pattern recognition is a classification problem. The input to a pattern recognition device is a set of N measurements and the output is the classification. The N measurements constituting a pattern is called a "pattern" vector. The selection of measurements is critically important to the performance of a classification system. It is desirable to transform a pattern vector into a compact set of salient features, called a "feature" vector. Unfortunately there is no general theory of feature selection. One wishes the set of features to be small for efficiency but sufficiently large to ensure accurate performance.

Figure 4:
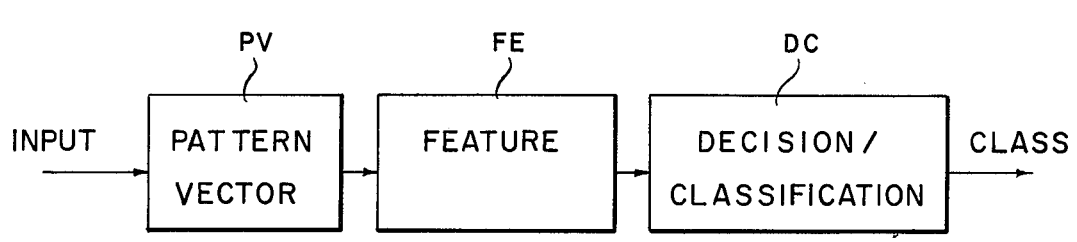
FIG. 4 is a functional diagram of a pattern recognition machine for use in the system and method of the present invention.

In block diagram form, a pattern recognition machine would appear as in FIG. 4 and would include pattern vector generator means PV, a feature extractor FE, and a decision/classification means DC. A "supervised" learning machine assumes that the class associated with each inputted pattern vector is known. During "training", the feature vector and class are connected and stored in the machine. Most storage methods for such devices are "tree" based. During "execution", a feature vector is inputted and compared with previously stored patterns. With respect to some prespecified criterion, the inputted feature vector is "matched" to the stored patterns and the associated classification of that stored pattern is outputted by DC. For a more detailed discussion reference may be had to T. Y. Young and T. W. Calvert, *Classification Estimation and Pattern Recognition*, American Elsevier, 1974.

It is desired to choose a subset of patterns to be used as a feature set. The feature vector is to be small in dimension but rich in information. The criterion developed by the present invention is based on a correlation coefficient metric.

Let the pattern vector be of dimension N, say $x$, where $x \epsilon \Omega x$ and $\Omega x$ is the pattern space. Let a transformation T (in general, nonlinear) take the pattern vector ($E^N$) $x$ into a M dimensional tentative feature vector, say $y$, such that $$y = Tx, \, y \epsilon \Omega y \text{ (tentative feature space)} \quad \text{Equation (2)}$$

Furthermore, let the known classification of $x$ be $c$. Then, for the purpose of supervised pattern recognition, the M + 1 tuple $$(y, c)$$

is sufficient. However, the vector $y$ may be too large or highly redundant for efficient machine operation. Therefore, let a subset of $y$, say $\hat{y}$ be chosen which optimizes some information-size criterion. That is, for $\phi(y)$ a given performance index, if there exists an optimal $\hat{y}$, such that for $$\hat{y} \epsilon \Omega \hat{y} \text{ (feature space)} \, C\Omega y$$

Then $$\phi(\hat{y}) = \max_{\forall y \epsilon \Omega y} \phi(y) \quad \text{Equation (3)}$$

(construction of $\phi(y)$) Let $R_{(y, c)}$ be the $(M+1) \times (M+1)$ matrix of normalized correlation coefficients such that $$R_{(y,c)} = [\{R\tau_i \tau_j\}]: \text{ where}$$

$$i, j = 1, ..., M + 1$$

$$\tau_i = y_i : i = 1, ..., M$$

$$\tau_{M+1} = C$$

$$-1 \leq \frac{R\tau_i \tau_j}{R\tau_i \tau_j = 1 \forall_i} \leq 1 \forall_i$$

Equation (4)

Define a $M \times M$ correlation dependent value matrix to be given by $$V = [\{V_{ij}\}]: \text{ where}$$

$$V_{ij} = R_{Y_{i,c}} \text{ if } i = j$$

$$V_{ij} = 1 - R_{Y_i, Y_j} \text{ if } i \neq j$$

Equation (5)

The philosophy underlying the construction of V is
1. The on-diagonal term represents how strongly feature $i$ is correlated to class $c$. Note $0 \leq V_{ii} \leq 1$. It is desired to choose features in $\Omega y$ which are strongly correlated to class.
2. The off-diagonal terms inversely relate the correlation of feature $i$ to $j$. It is desired to find features in $\Omega y$ which are weakly correlated (or non-redundant). Therefore, one is interested in those $V_{ij}$, $i \neq j$, which are near unity.

Let K features, $K \leq M$, be chosen from $\Omega y$. Let S be an index set of the K feature. Let $e_K$ be a M dimensional vector defined by $$e_K = \begin{bmatrix} \vdots \\ \tau_i \\ \vdots \end{bmatrix}; \tau_i = 1 \text{ if } i \in S, \, 0 \text{ otherwise}$$

Equation (6)

and $\Sigma \tau_i = K$

Let $\phi(y) = e_K^T V e_K = \|e_K\|_V^2$

Equation (7)

Therefore, maximizing $\phi(y)$ will result in defining a feature set $\Omega \hat{y}$ whose members are strongly correlated to class and weakly correlation to each other. Direct search methods of operations research can be used to obtain the desired $\hat{y} \in \Omega \hat{y}$.

The structure of the learning machine is a tree as discussed in the following publications:
1. N. J. Nilsson, *Learning Machines*, McGraw-Hill, 1965.
2. L. Cooper and D. Steinberg, *Introduction to Methods of Optimization*, Saunders, 1970.

It contains nodes, levels, branches, and paths to node k in the usual sense. For a N dimensional feature vector there are N levels. The value of a unique path through the tree shall be called a "branch". The value of the branch is stored in the "leaf" and it is physically located at the end of that path. The leaf contains probabilistic information of what classes gave rise to that path during learning. The probability of transferring from node $k$ having value $x^k$ at level $j$ to node $l$ having value $x^l$ at level $j + 1$ is stored. It is encoded into the value of node $l$ so as not to increase memory storage requirements. Let this transitorial probability be denoted $p(l/k,j)$.

during execution, a feature vector is compared with the paths generated during learning. The path, say X, which minimizes the performance index $\phi(x,y)$, where $$\theta(X^j, y) = \sum_{i=2}^{n} (1 - p(l/k; i)) \|y_i - x_i\|_{W_i}^2 + \|y_i - X_i\|_{W_i}^2$$

Equation (8)

$y^l$ is the inputted feature vector at level $l$, $l = 1, \ldots N$ $x_l^j$ is the $l$ th level value of a connected string of node values, say $x^j$, $$X^j = x_1^j, \ldots, x_n^j$$

shall be deemed optional if $$\theta(X^*, y) = \min \theta(X^j), y)$$

Equation (9)

The philosophy underlying the structure of $\theta$ is
1. If the difference between a query $y_i$ and stored $x_i$ at some level $k$ is large (small) the "raw" cost of that branch is large (small).
2. If the probability of making a transition from $x_i$ at level $k$ to $k_j$ at level $k + 1$ is large (small), the "qualified" cost of that transition is small (large).
3. The product of the "raw" and "qualified" cost shall be called the "net" cost. It will be small only if the missmatch between $x_i$ and $y_i$ is small and if the probability of that associated transition is large.
4. The weights $W_i$ reflect the designs apriori felling on the importance of feature $i$. That is, if feature $i$ is considered critically important (moderately important) its net error will be magnified (reduced) by choosing a large (small) value for $W_i$.

Branch and bounds methods are used to optimally search the tree during execution as described in N. Agin, "Optimum Seeking With Branch and Bound," Management Science, 13, 1966. These methods affect an efficient search algorithm. Once the optional path, say $X^{j*}$ is obtained, the value of that path will be outputted. Since the leaf contains statistical information about the classification of $x^{j*}$, the output classification decision can be of two forms, namely for M classes.

1. a probability vector $$C^* = (C_1^*, \ldots, C_m^*)$$

such the $\sum_{i=1}^{n} C_i = 1, 0 \leq C_i \leq 1$

Equation (10)

2. most probable $$C^* = \left\{ i \mid C_i^* \geq C_j, \sum_{l=1}^{m} C_l = 1, 0 \leq C_l \leq 1 \right\}$$

Equation (11)

Of course, if the maximal element of $C^*$, say $C_o^*$, is below some prespecified value, a deferred decision rule can be used.

Preferred Embodiment

Figure 5:
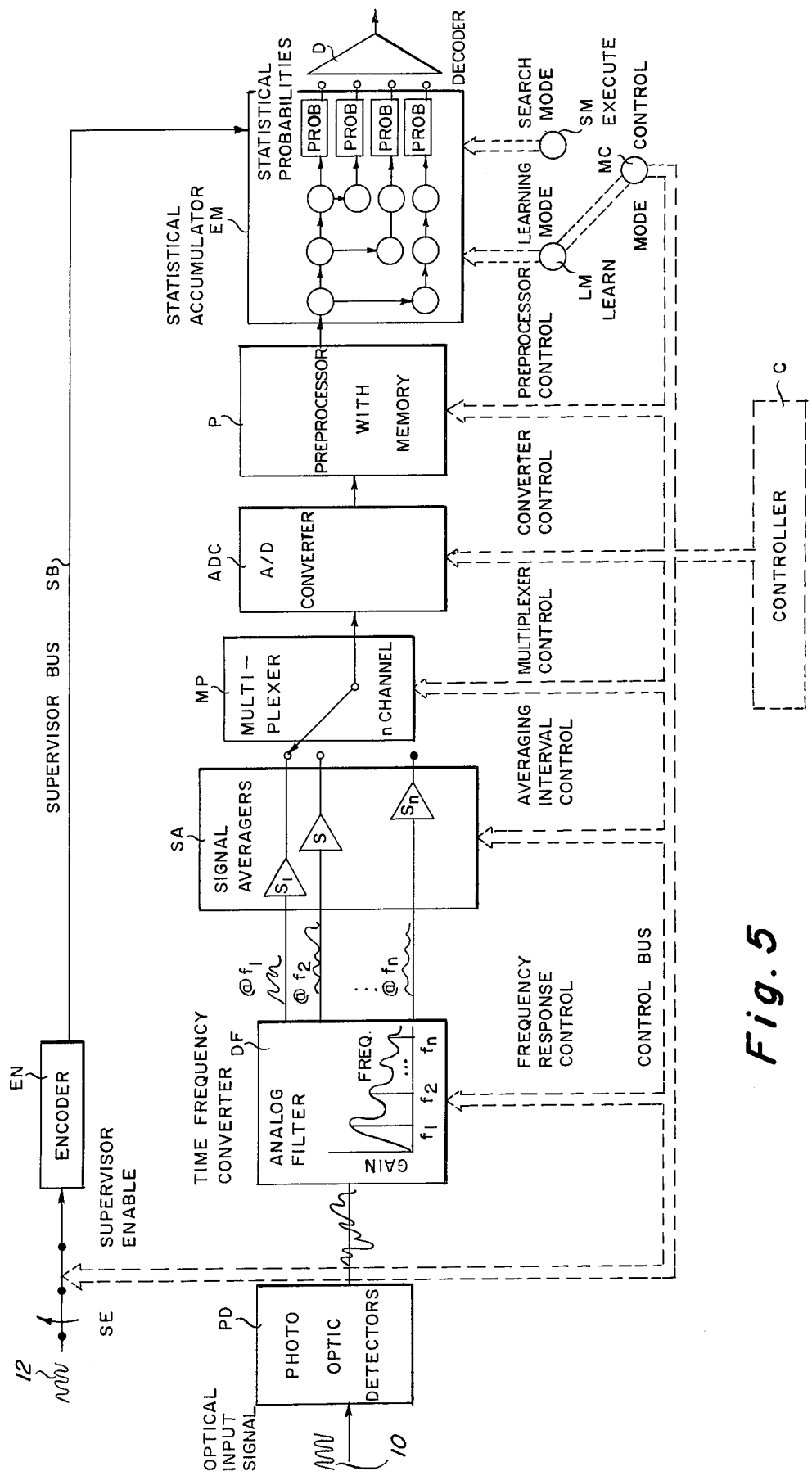
FIG. 5 is a schematic diagram of a system for automating the measurement procedures of the pattern recognition method of the present invention.

Referring in detail to FIG. 5 there is illustrated a preferred embodiment of a system for automatically practicing the pattern recognition method of the present invention.

As shown therein an optical input signal 10 generated by passing a laser beam through a crosswind of high turbulence is introduced into a photo-optical detector PD such as photodiodes or any other type of photo-optical detector which is well known in the art. The optical signal is converted by detector PD into an electrical signal representative of the spectral pattern of light scattered or refracted by the crosswind. The signal 10 may be generated by a known crosswind or a crosswind to be detected depending on whether the system is in the learn or execute mode as will become more fully apparent hereinafter.

Photodetector PD has its output connected to the input of a filter or time frequency converter DF. The filter DF may consist of active filters followed by full wave rectifiers which divide the signal from detector PD into discrete frequency components at its outputs $f_1$ to $f_n$ or a digital filter.

The outputs of filter DF are connected to the inputs of signal averager SA. Signal averager SA includes a plurality of averagers $S_1$ to $S_n$ corresponding in number to the outputs of $f_1$ to $f_n$ of filter DF.

A time multiplexer MP having N channels is provided for sequentially sampling the outputs of averages $S_1$ to $S_n$ in response to control signals from a main controller C, as will be described hereinafter.

An analog to digital converter ADC is provided to operate on the train of signals emerging from multiplexer MP to digitize the signals for processing in a preprocessor P.

The signals from preprocessor P are then stored in a main memory bank or accumulator EM.

A decoder D is provided for extracting information from the main memory bank EM.

A mode control switch MC is provided to switch the memory between the learn and execute modes respectively.

Other statistical information relative to the crosswind being measured may also be stored in memory EM. For example, a signal 12 representative of various atmospheric parameters may be through supervisor enable switch SE, encoder EN, which classifies said parameters, and supervisor bus SB to memory EM.

Controller C may be any well known type of Central Processing Unit (CPU).

Operation of Preferred Embodiment

The operation of the system of FIG. 5 may best be described in two phases i.e. the training phase and the execution phase. The training phase includes the steps of gathering and classifying data from known parameters of crosswind and atmospheric conditions. The execution phase involves the comparison of the data stored in the training phase with a test signal inputted to detector PD inorder to determine the crosswind parameters contained by the test signal. Thus during the execution phase an accurate measurement of crosswind may be obtained.

Referring to the training phase with switches SE and MC in the positions shown, a plurality of signals 10 may be sequentially introduced into detector PD. These signals for example would correspond to various crosswind velocities, say from 1 to 2 m/s. Each of the signals would then be entered into detector DF and divided into N frequency components as specified by controller C. The filter outputs would then be averaged over a time interval established by controller C by signal averagers $S_1$ to $S_n$. The averaged signals would then be time multiplexed by MP in response to time control signals from controller C. Next controller C would order the serial digitization of the multiplexed outputs. The digitized signals would then be fed into a preprocessor P wherein the digitized information would be formatted and analyzed in a pattern recognition sense under control of controller C. The data from preprocessor C would then be introduced into main memory bank M where it would be stored for subsequent comparison with a test signal.

Simultaneously with the input of standard crosswind data atmospheric parameter data 12 may be inputted to the system during the training phase. These could include any or all of the following parameters: anemometer measurement, atmospheric structure, coefficient, surface temperature, humidity, etc. This data is introduced through switch SE in response to a supervisory enable signal from controller C. This data is processed by encoder EN into integer values and is passed along supervisor bus SB to memory M.

Referring in detail to the execution phase an unknown test signal representative of a crosswind being tested is entered into detector PD. The switches SE and MC are moved to the execute mode positions by controller C. SE is opened and MC is connected to search mode terminal SM. The detector output is entered into filter DF and divided into N frequency components, as before during the training phase. The filter outputs are averaged, as before by averager SA multiplexed by MP, digitized by ADC, preprocessed by P, and stored in memory M.

The controller C then searches the memory M for the best match of the stored data and the test signal data and outputs by way of decoder D the classified data representative of the desired crosswind parameters of the test signal. Accordingly, the observed spectral features of the test signal are analyzed to yield a best estimate of crosswind.

In practicing the present invention, the following commercially available components for the various circuits elements of the system of FIG. 5 of the invention are as follows:

| ELEMENT | COMMERCIAL COMPONENT |
| --- | --- |
| 1. Photodetector PD | 1. Photo-darlington (RCA) Photo-Multiplier (United Detector) |
| 2. Filter DF | 2. KTI - FS50 |
| 3. Signal Averagers SA | 3. Motorola Monolithic Differential Amplifier |
| 4. Multiplexer MP | 4. Analog Devices Monolithic Multiplexers |
| 5. A/D Converter ADC | 5. Analog Devices Monolithic ADC |
| 6. Preprocessor P | 6. Hewlett-Packard 2100S-Software |
| 7. Memory EM-RAM | 7. Hewlett-Packard 2100S-Software |
| 8. Decoder D | 8. Hewlett-Packard 2100S-Software |
| 9. Encoder EN | 9. Hewlett-Packard 2100S - Software |
| 10. Controller C-ROM | 10. Hewlett-Packard 2100S-Software |

We wish it to be understood that we do not desire to be limited to the exact details of construction shown and described, for obvious modifications can be made by a person skilled in the art.

We claim:

1. A pattern recognition method for measuring crosswind parameters comprising the steps of:
   a. generating a spectral profile signal of an optical radiation beam passing through a plurality of crosswinds having known parameters;
   b. dividing said spectral profile signals for each known crosswind into selected frequency components;
   c. averaging said frequency components over a selected period of time;
   d. digitizing said selected and averaged frequency components;
   e. classifying the digitized frequency components in accordance with crosswind parameters of interest;
   f. storing said classified frequency components as digital retrievable data in a memory;
   g. generating a test spectral profile signal of said optical beam passing through crosswind of unknown parameters;
   h. performing steps (b) to (f) on said test signal; and
   i. matching the test signal parameter data with the closest known parameter data to determine a best estimate of the parameters of the unknown crosswind.

2. The method of claim 1 wherein selected atmospheric parameters other than crosswind are stored for comparison.

3. A pattern recognition system for measuring crosswind parameters comprising:
   a. means for generating a spectral profile signal of an optical radiation beam passing through a plurality of crosswinds having known parameters;
   b. filter means for dividing said spectral profile signals into selected frequency components;
   c. means for averaging said selected frequency components over a selected period of time;
   d. means for digitizing said selected and averaged frequency components;
   e. means for classifying said frequency components in accordance with crosswind parameters of interest;
   f. memory means for storing said classified frequency components as retrievable digital data;
   g. means for generating a test spectral profile signal of said optical beam passing through a crosswind of unknown parameters;
   h. central processing means for feeding each of said spectral profile signals generated by crosswinds of known parameters through means (b) through (e) for storage in said memory means, for feeding said test spectral profile signal through means (b) through (e) for storage in said memory means, and for matching the sotred test signal data with the closest stored known parameter data to obtain a best estimate of the parameters of the unknown crosswind.

4. The system of claim 1 including means for generating atmospheric parameters other than crosswind parameters and storing said atmospheric parameters in said memory means.

5. The system of claim 3 further including time multiplexing means for time multiplexing the frequency signals generated by said averaging means and sequentially feeding said signals to said means for digitizing.

* * * * *